UNITED STATES PATENT OFFICE.

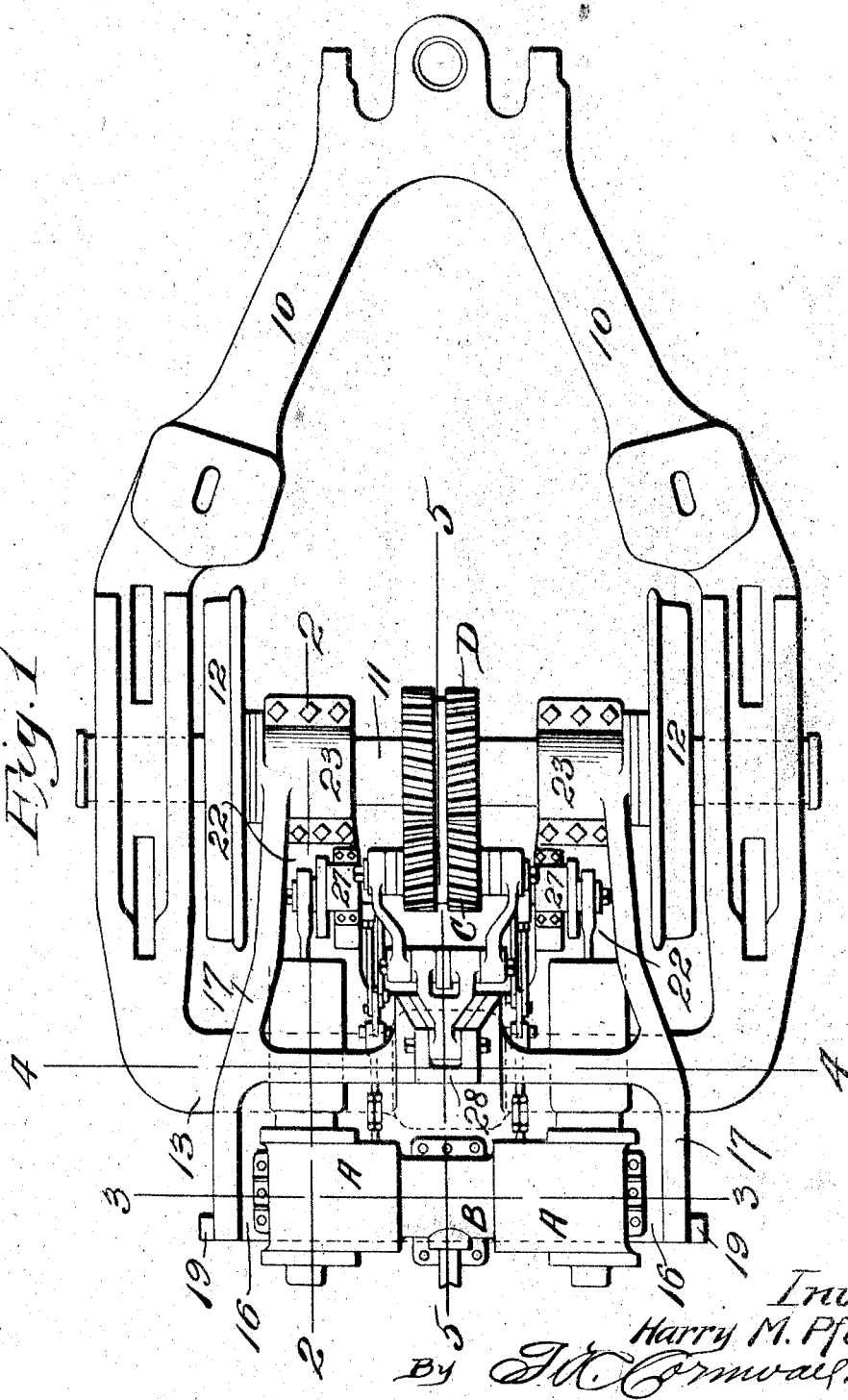

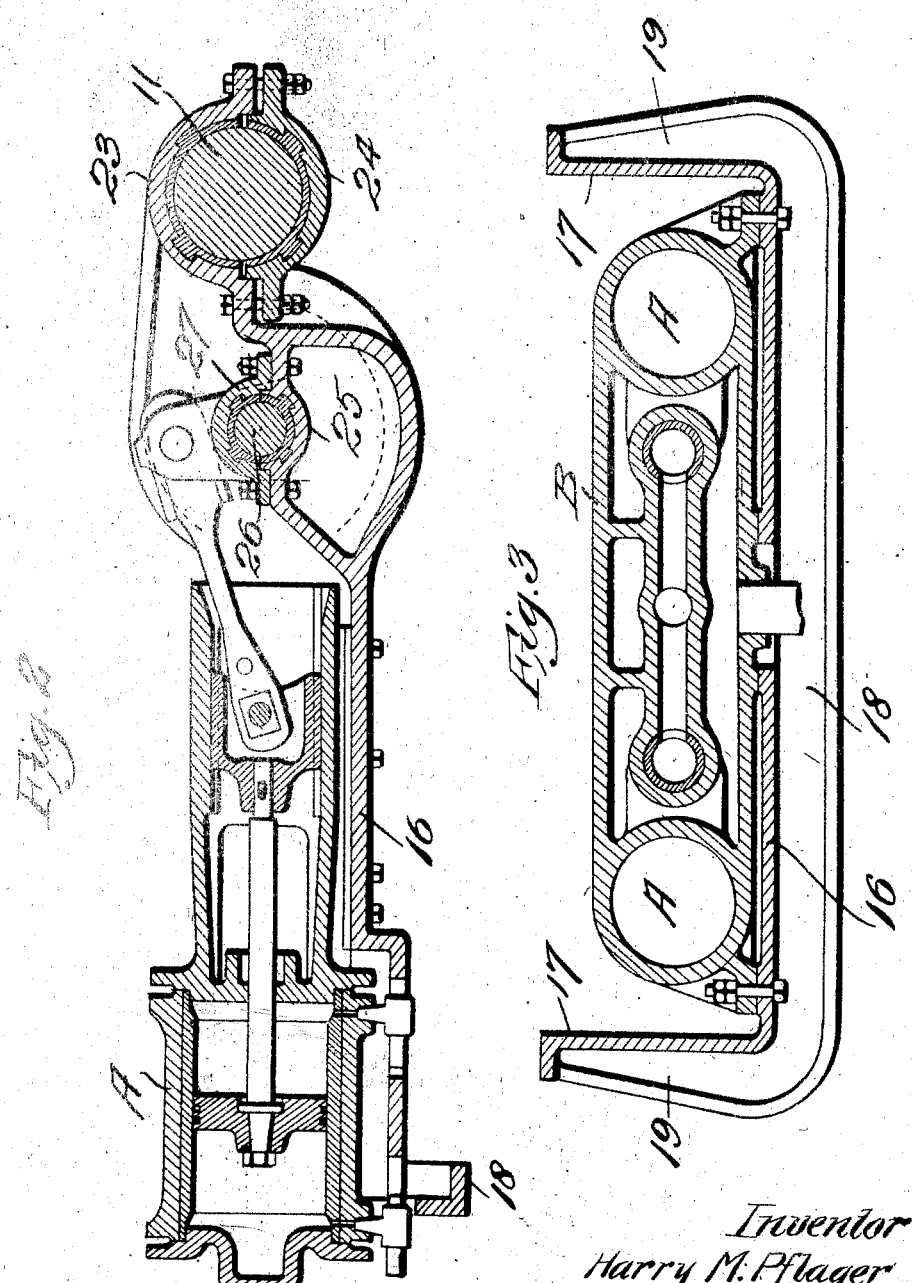

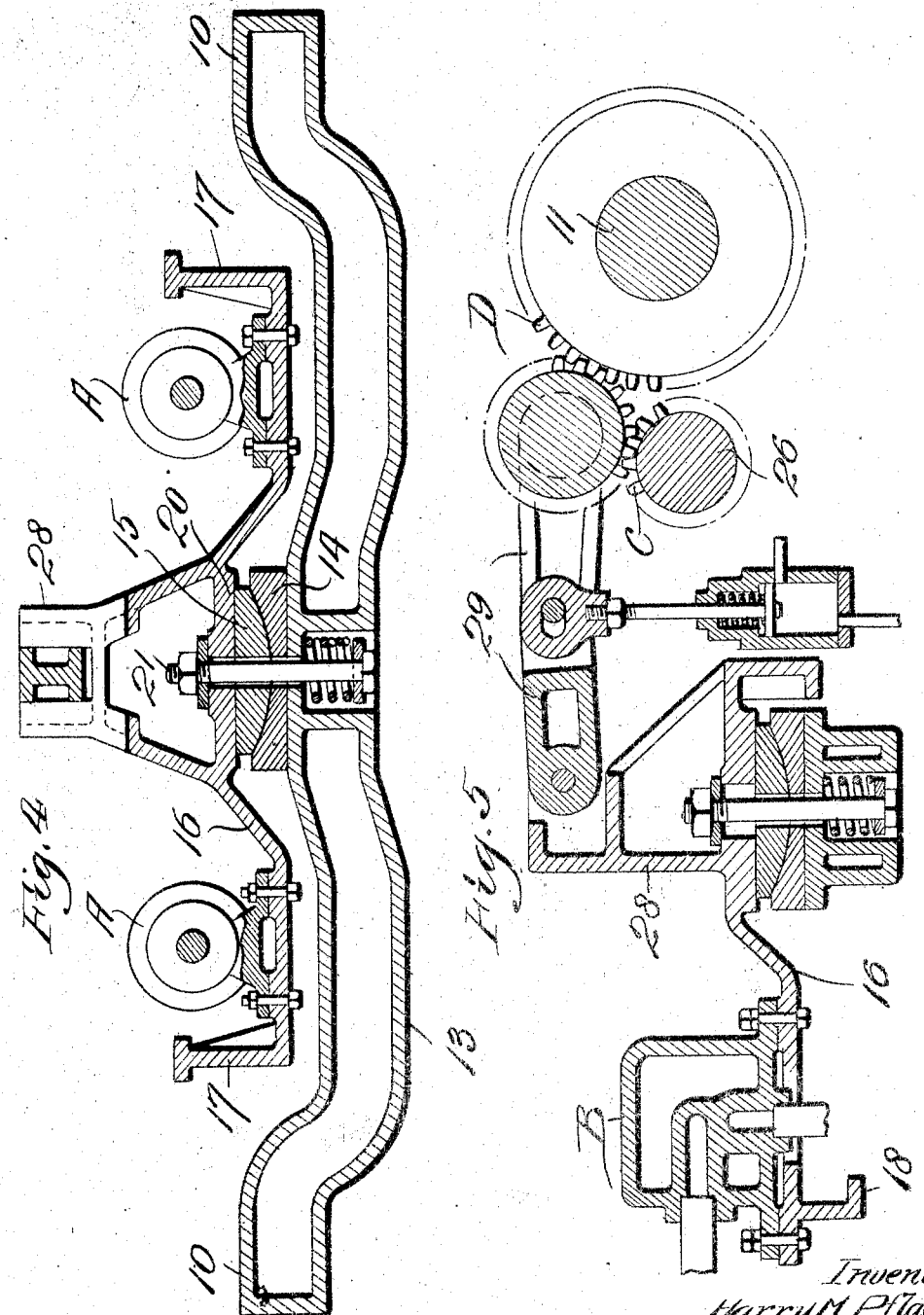

HARRY M. PFLAGER, OF ST. LOUIS, MISSOURI.

BOOSTER-MOTOR SUPPORT.

1,401,553.

Specification of Letters Patent. Patented Dec. 27, 1921.

Application filed September 10, 1919. Serial No. 322,862.

*To all whom it may concern:*

Be it known that I, HARRY M. PFLAGER, a citizen of the United States, residing at St. Louis, Missouri, have invented a certain new and useful Improvement in Booster-Motor Supports, of which the following is a full, clear, and exact description, such as will enable others skilled in the art to which it appertains to make and use the same, reference being had to the accompanying drawings, forming part of this specification.

My invention relates generally to trailer trucks for locomotives and more specifically to a trailer truck which is provided with a supporting frame designed particularly to receive a booster motor for locomotives such as disclosed in United States patent to Howard L. Ingersoll, No. 1,339,395, dated May 11, 1920.

In my Patent No. 1,357,928, dated November 2, 1920, I have disclosed a form of mounting for locomotive booster motors such as contemplated by the Ingersoll system, and in my Patent No. 1,381,496, dated June 14, 1921, I have disclosed a form of trailer truck also especially designed for use in connection with the Ingersoll system. I do not, therefore, claim in this application any of the inventions set forth in the claims of the before-mentioned patents.

The principal object of my present invention is to provide a relatively simple, strong and efficient supporting frame or bed plate which will readily coöperate with the trailer truck frame in supporting the booster motor, its associated parts, and the driving connections between said motor and the trailer truck axle.

Further objects of my invention are, to construct the supporting frame or bed plate in a single piece, preferably by casting, thereby materially increasing the strength and rigidity of the complete structure and eliminating the time, labor and expense ordinarily involved in the assembling of a built-up structure, and, further, to form integral with the bed plate or supporting frame, certain bearings, lugs, brackets, and the like that receive or coöperate with parts of the trailer truck and the supported booster motor.

With the foregoing and other objects in view, my invention consists in certain novel features of construction and arrangement of parts, hereinafter more fully described, and claimed, and illustrated in the accompanying drawings, in which—

Figure 1 is a top plan view of a locomotive trailer truck and showing a booster motor supporting frame or bed plate of my improved construction applied thereto.

Fig. 2 is an enlarged vertical section taken approximately on the line 2—2 of Fig. 1.

Fig. 3 is an enlarged cross section taken approximately on the line 3—3 of Fig. 1.

Fig. 4 is an enlarged cross section taken approximately on the line 4—4 of Fig. 1.

Fig. 5 is an enlarged vertical section taken approximately on the line 5—5 of Fig. 1.

Referring by numerals to the accompanying drawings, which illustrate a practical embodiment of my invention, 10 designates a radial trailer truck frame, the rear portions of the side members of which are arched and provided with pedestal jaws between which are arranged in the usual manner the journal boxes which receive the ends of the trailer truck axle 11, and the latter being provided with the usual wheels 12.

It will be understood that this trailer truck is pivotally connected at its forward end to the locomotive frame and for a detailed description of the construction of this frame, reference may be had to my aforesaid Patent, No. 1,381,496.

The rear transverse rail 13 of the trailer truck frame is provided at a central point on its top with a bearing plate 14 upon which is loosely arranged a bearing member 15, the latter serving as a rocking support for the bed plate and parts carried thereby.

The main body portion of the supporting framework or bed plate contemplated by my invention comprises a horizontally disposed plate 16, preferably formed of cast metal, and provided on its side edges with upstanding flanges 17. Formed integral with this plate at or adjacent to its rear end is a transversely disposed depending flange 18, the end portions of which are extended upward on the outer faces of the side edges 17 as designated by 19.

Formed on the underside of the plate 16 a short distance in front of its rear end and at a point midway between its sides is a horizontally disposed portion 20 having a flat underface and which latter bears directly on top of the bearing member 15. Passing vertically through the alined apertures formed in the transverse rear member 13 of the truck frame bearing plate 14 and bearing members 15 and 20 is a pin or bolt 21 which retains the parts just mentioned in assembled relation, and at the same time, permits a limited degree of relative rocking movement between the truck frame and the bed plate.

The forward portion of the plate 16 is bifurcated, thereby forming forwardly projecting portions 22 and the forward ends of said forwardly projecting portions terminate in transversely disposed semi-cylindrical bearings 23 which receive the trailer truck axle 11, the latter being retained in said bearings by bearing members 24 which are arranged beneath and secured to said bearings 23 in any suitable manner.

Thus it will be seen that the bed plate has three bearings or points of support upon the trailer truck, namely, two upon the trailer truck axle 11, and one upon the rear member 13 of the trailer truck frame.

Formed on the forwardly projecting portions 22 of the bed plate and a slight distance to the rear of axle bearings 23 are transversely alined bearings 25 which receive the crank shaft 26 of the booster motor and the latter being maintained in said bearings by suitable removable cap plates 27.

Formed integral with the bed plate 16 and preferably at a point over the plate or bearing member 29 is an upwardly projecting bracket 28, the upper end portion of which serves as a point of pivotal connection for the rear one of a pair of toggle links 29 which latter are associated with the driving connections between the booster motor and trailer truck axle 11 and which connections are fully described in said before-mentioned Ingersoll patent.

The cylinders A of the booster motor are secured in any suitable manner on top of the rear portion of the bed plate 16 and arranged between said cylinders is the steam chest B.

The piston rods of the motor are connected in the usual manner to the crank shaft 26 and the driving pinion C on the latter adapted to engage a gear wheel D that is fixed on the trailer truck axle 11 between the bearings 23.

Thus it will be seen that I have provided a relatively simple and efficient bed plate for the booster motors of locomotives, said bed plate being designed and constructed so as to readily coöperate with the trailer truck in providing a firm and substantial support for the booster motor and associated parts. Further, by forming the bed plate in a single piece, the manufacturing cost thereof is minimized and the finished structure while relatively light in weight has great strength and rigidity, and is provided at the proper points with integrally formed bearing members, brackets, and the like, which receive essential parts of the booster motor mechanism.

It will be readily understood that minor changes in the size, form and construction of the various parts of my improved bed plate or support for booster motors may be made and substituted for those herein shown and described, without departing from the spirit of my invention, the scope of which is set forth in the appended claims.

I claim:

1. The combination with a radially movable trailer truck frame and its axle, of a booster motor bed plate formed in a single piece and provided adjacent to its forward ends with bearings adapted to receive the trailer truck axle and the rear portion of said bed plate having bearing on said trailer truck frame.

2. A booster motor bed plate formed in a single piece and provided adjacent to its forward ends with bearings adapted to receive the axle of the trailer truck with which the bed plate is associated, and the underside of said bed plate being provided with a bearing that is adapted to engage a part of the frame of the trailer truck.

3. The combination with a trailer truck frame, of a booster motor bed plate supported by said frame and flexibly connected to the axle of the trailer truck and booster motor carried by said bed plate, and bearings on said bed plate for the crank shaft of said booster motor.

4. A booster motor bed plate formed in a single piece, bearings on said bed plate, which bearings are adapted to receive the axle of the trailer truck with which the bed plate is associated, and bearings on said bed plate for the crank shaft of the supported booster motor.

5. A booster motor bed plate formed in a single piece, bearings on said bed plate, which bearings are adapted to receive the axle of the trailer truck with which the bed plate is associated, bearings on said bed plate for the crank shaft of the supported booster motor, and a bearing on the underside of said bed plate, which last mentioned bearing is adapted to engage a part of the frame of the trailer truck.

6. A booster motor support comprising a horizontally disposed plate adapted to be positioned on a trailer truck frame, arms projecting forwardly from said plate, trailer truck axle bearings on said arms and booster motor crank shaft bearings on said plate adjacent to the trailer truck axle bearings.

7. A booster motor support comprising a horizontally disposed plate adapted to be positioned on the rear portion of a trailer truck frame, arms projecting forwardly from said plate, and booster motor crank shaft bearings on said arms.

8. A booster motor support comprising a horizontally disposed plate adapted to be positioned on the rear portion of a trailer truck frame, arms projecting forwardly from said plate, trailer truck axle bearings on said arms, and booster motor crank shaft bearings on said arms.

In testimony whereof I hereunto affix my signature this 4th day of September, 1919.

HARRY M. PFLAGER.